United States Patent
Lam et al.

(10) Patent No.: US 9,413,685 B1
(45) Date of Patent: Aug. 9, 2016

(54) METHOD AND APPARATUS FOR CROSS DOMAIN AND CROSS-LAYER EVENT CORRELATION

(75) Inventors: Cheuk Lam, Yorktown Heights, NY (US); Tong Yu, Great Falls, VA (US); David Moran, Holly Springs, NC (US); Pavan Banda, Westborough, MA (US); Lida He, Sleepy Hollow, NY (US)

(73) Assignee: EMC Corporation, Hopkinton, MA (US)

( * ) Notice: Subject to any disclaimer, the term of this patent is extended or adjusted under 35 U.S.C. 154(b) by 832 days.

(21) Appl. No.: 13/536,726

(22) Filed: Jun. 28, 2012

(51) Int. Cl.
   G06F 15/16 (2006.01)
   G06F 15/173 (2006.01)
   H04L 12/915 (2013.01)
   H04L 12/18 (2006.01)
   H04L 29/12 (2006.01)
   G06F 3/06 (2006.01)

(52) U.S. Cl.
   CPC ............ *H04L 47/785* (2013.01); *G06F 3/0667* (2013.01); *H04L 12/1895* (2013.01); *H04L 29/12301* (2013.01)

(58) Field of Classification Search
   CPC ......... G06F 11/00; G06F 11/25; G06F 17/30; G06F 15/16; G06F 15/173; G06F 9/44; G06F 11/079; G06F 11/006; G06N 5/02; G01R 31/08
   USPC ......................................... 709/218, 219, 223
   See application file for complete search history.

(56) References Cited

U.S. PATENT DOCUMENTS

| | | | |
|---|---|---|---|
| 5,528,516 A | 6/1996 | Yemini et al. | |
| 5,661,668 A | 8/1997 | Yemini et al. | |
| 6,006,016 A * | 12/1999 | Faigon ................ | G06F 11/2252 714/26 |
| 6,249,755 B1 * | 6/2001 | Yemini ............... | G06F 11/2257 702/181 |
| 6,347,374 B1 | 2/2002 | Drake et al. | |
| 6,868,367 B2 | 3/2005 | Yemini et al. | |
| 7,003,433 B2 | 2/2006 | Yemini et al. | |
| 7,016,954 B2 | 3/2006 | McKenzie et al. | |
| 7,107,185 B1 | 9/2006 | Yemini et al. | |
| 7,349,826 B2 | 3/2008 | Subramanian et al. | |
| 7,500,142 B1 | 3/2009 | Cowart et al. | |
| 7,529,181 B2 * | 5/2009 | Yardeni et al. ................ | 370/216 |
| 7,552,443 B2 | 6/2009 | Upton | |
| 7,574,413 B2 * | 8/2009 | Larson ................... | G06Q 10/10 706/47 |
| 7,979,245 B1 | 7/2011 | Bourlatchkov et al. | |

(Continued)

OTHER PUBLICATIONS

U.S. Appl. No. 13/435,017 Office Action dated Mar. 7, 2014, 19 pages.

(Continued)

*Primary Examiner* — Aftab N. Khan
(74) *Attorney, Agent, or Firm* — Daly, Crowley, Mofford & Durkee, LLP

(57) ABSTRACT

Methods and apparatus to provide a cloud computing system having cross domain event correlation. In one embodiment, a first alert is received in a first domain of the system domains and a second alert in a second domain of the system domains, the first and second alerts caused by an event. A topology of the system is determined and connectivity matching is performed to identify connections between a port in the first domain and a port in the second domain. Identify matching, using unique identifiers for domain components, is performed to determine that a first component in the first domain associated with the first alert is the same component as a second component associated with the second alert in the second domain for cross domain event correlation.

17 Claims, 15 Drawing Sheets

(56) References Cited

U.S. PATENT DOCUMENTS

| | | | |
|---|---|---|---|
| 8,031,634 B1 * | 10/2011 | Artzi | H04L 12/4641 |
| | | | 370/254 |
| 8,117,306 B1 | 2/2012 | Baumback et al. | |
| 8,301,755 B2 | 10/2012 | DePeuter et al. | |
| 8,479,048 B2 | 7/2013 | Morimura et al. | |
| 8,886,705 B1 | 11/2014 | Tewari et al. | |
| 9,053,000 B1 * | 6/2015 | Lam | G06F 11/079 |
| 2002/0174267 A1 | 11/2002 | Erdmenger et al. | |
| 2003/0204759 A1 | 10/2003 | Singh | |
| 2004/0049572 A1 | 3/2004 | Yamamoto et al. | |
| 2004/0083284 A1 * | 4/2004 | Ofek | H04L 41/12 |
| | | | 709/224 |
| 2005/0114487 A1 | 5/2005 | Peng et al. | |
| 2005/0251567 A1 | 11/2005 | Ballew et al. | |
| 2007/0192859 A1 | 8/2007 | Shahar et al. | |
| 2009/0070463 A1 | 3/2009 | Cowart et al. | |
| 2009/0182698 A1 * | 7/2009 | Bethke et al. | 706/47 |
| 2011/0029960 A1 | 2/2011 | Cimadamore et al. | |
| 2011/0055138 A1 | 3/2011 | Khanduja et al. | |
| 2011/0154367 A1 * | 6/2011 | Gutjahr | G06F 9/542 |
| | | | 719/316 |
| 2011/0314330 A1 | 12/2011 | Morimura et al. | |
| 2011/0320874 A1 | 12/2011 | Shimada et al. | |
| 2012/0151025 A1 | 6/2012 | Bailey et al. | |
| 2012/0221314 A1 | 8/2012 | Bourlatchkov et al. | |
| 2012/0221589 A1 | 8/2012 | Shahar et al. | |
| 2012/0253773 A1 | 10/2012 | Cheon et al. | |
| 2012/0297061 A1 | 11/2012 | Pedigo et al. | |
| 2013/0035976 A1 | 2/2013 | Buffett | |
| 2013/0166724 A1 | 6/2013 | Bairavasundaram et al. | |
| 2014/0237297 A1 | 8/2014 | Nagura et al. | |

OTHER PUBLICATIONS

U.S. Appl. No. 13/435,017, filed Mar. 30, 2012, He, et al.
U.S. Appl. No. 13/536,512, filed Jun. 28, 2012, Zhang, et al.
U.S. Appl. No. 13/628,706, filed Sep. 27, 2012, Lam, et al.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, EMC², Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, EMC², Feb. 2011, 24 pages.
VMware vStorage APIs for Array Integration with EMC VNX Series for NAS, Benefits of EMC VNX for File Integration with VMware VAAI, White Paper, EMC Solutions Group, Jan. 2012, EMC²,17 pages.
Vblock™ Infrastructure Platforms 2010 Vblock Platforms Architecture Overview, Version 1.3, Nov. 2011, The Virtual Computing Environment Company, www.vce.com, 25 pages.
Best Practices for Deploying VMware vCloud Director on Vblock Infrastructure Platforms, Sep. 2011, The Virtual Computing Environment Company, www.vce.com, 20 pages.
Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock™ Infrastructure Platforms Technical Overview, © 2011 VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 75 pages.
U.S. Appl. No. 13/435,017, filed Mar. 30, 2012, 93 pages.
U.S. Appl. No. 13/536,512, filed Jun. 28, 2012, 83 pages.
U.S. Appl. No. 13/628,706, filed Sep. 27, 2012, 120 pages.
U.S. Appl. No. 13/536,512 Office Action dated May 15, 2014, 19 pages.
U.S. Appl. No. 13/628,706 Notice of Allowance dated Sep. 29, 2014, 15 pages.
U.S. Appl. No. 13/435,017 Notice of Allowance dated Oct. 16, 2014, 17 pages.
U.S. Appl. No. No. 13/536,512 Response filed on Nov. 17, 2014 14 pages.
U.S. Appl. No. 13/536,512 Office Action dated Mar. 6, 2015, 24 pages.
Request for Continued Examination filed Jun. 8, 2015; for U.S. Appl. No. 13/536,512; 1 page.
Response filed Jun. 8, 2016; to Office Action dated Mar. 6, 2015; for U.S. Appl. No. 13/536,512; 11 p. 2.
U.S. Appl. No. 13/536,512 Notice of Allowance dated Feb. 8, 2016, 26 pages.

\* cited by examiner

Port Failure in SAN
37 raw alerts received

| Domain | Raw Alert | Count (37) | Correlation |
|---|---|---|---|
| SAN Switch | linkDown (SAN port down) | 1 | Root cause |
| UCS | UCSFcPLO port-failed (FC uplink down) | 1 | Peer of the SAN port (matched via WWNs) |
| UCS | UCSAdaptorHostFcIf link-down (Host HBA down) | 4 | Sharing the same VSAN with the SAN port |
| UCS | UCSDcxVif vif-down (Virtual interface down) | 4 | Virtual interfaces layered over the host HBA |
| UCS | UCSDcxVc link-down (Virtual circuit down) | 4 | Virtual circuits connecting the virtual interfaces to FIC |
| vCenter | EsxProblemStorageRedundancyDegraded | 10 | Caused by host HBA down |
| vCenter | EsxProblemStorageRedundancyLost | 13 | Caused by host HBA down |

*FIG. 6*

METHOD AND APPARATUS FOR CROSS DOMAIN AND CROSS-LAYER EVENT CORRELATION

BACKGROUND

As is known in the art, cloud computing systems, even in pre-architected and pre-qualified environments, contain a relatively large number of hardware devices and components and software applications, modules, and components. In the presence of a fault, alert, or other condition needing attention, it can be difficult to identify the source of the fault or alert since there are many complex components that may be provided by multiple vendors which may make it difficult to correlate information in an efficient manner.

For example, in a cloud computing environment, alerts and events from various event sources in platforms normally contain limited information that may not be meaningful and may seem unrelated to the environment from which they originate. It is challenging for IT personnel to extract executable data from the alerts and take appropriate action.

With large volumes of alerts/events constantly coming from various sources, it is time consuming to troubleshoot all of them all any prioritization. It is challenging to prioritize the alerts/events and take appropriate actions without correlating them and knowing which of the alerts or events are root causes and which are just symptoms. In addition, many of the IT resources are managed in silos by IT personnel specialized in certain technology domains. For example, when a blade in the Cisco Unified Computing System (UCS) fails or has performance issues its impact propagates to the ESX server deployed on the blade, to the virtual machines deployed on the ESX server, to the applications or critical services running on those virtual machines, to the critical business that relies on those services. It may take hours or even days to sort through those alerts or events, which may result in significant detrimental impact on an enterprise.

SUMMARY

In one aspect of the invention, a method comprises: in a cloud computing system having system domains including a storage domain, a network domain, a compute domain, and a virtual layer: receiving a first alert in a first domain of the system domains and a second alert in a second domain of the system domains, the first and second alerts caused by an event, determining a topology of the system including physical and logical connections for components in the storage, network, compute domains, and the virtual layer, performing, using a computer processor, connectivity matching to identify connections between a port in the first domain and a port in the second domain, and performing identify matching, using unique identifiers for domain components, to determine that a first component in the first domain associated with the first alert is the same component as a second component associated with the second alert in the second domain for cross domain event correlation.

The method can further including one or more of the following features: the first component comprises a storage volume in the storage domain, the first component comprises a port in the network domain for a switch component, the first component comprises a cable connected to a fabric in the compute domain, the first comprises a server in the virtual layer, querying the first alert, the unique identifiers include a WWPN or a UUID, and/or the first alert includes one of a server (blade or ESX) down or connection lost, a storage volume error, heartbeat timeout between a server and a datastore, a zoneset being deactivated, a port failure, a link down, a host adaptor down, a virtual circuit down, a SAN port down, a Fibre Channel link down, and/or a virtual interface down.

In another aspect of the invention, an article comprises: a computer readable medium containing non-transitory stored instructions that enable a machine to perform, in a cloud computing system having system domains including a storage domain, a network domain, a compute domain, and a virtual layer, receiving a first alert in a first domain of the system domains and a second alert in a second domain of the system domains, the first and second alerts caused by an event, determining a topology of the system including physical and logical connections for components in the storage, network, compute domains, and the virtual layer, performing, using a computer processor, connectivity matching to identify connections between a port in the first domain and a port in the second domain, and performing identify matching, using unique identifiers for domain components, to determine that a first component in the first domain associated with the first alert is the same component as a second component associated with the second alert in the second domain for cross domain event correlation.

The article can further include one or more of the following features: the first component comprises a storage volume in the storage domain, the first component comprises a port in the network domain for a switch component, the first component comprises a cable connected to a fabric in the compute domain, the first component comprises a server in the virtual layer, querying the first alert, the unique identifiers include a WWPN or a UUID, and/or the first alert includes one of a server (blade or ESX) down or connection lost, a storage volume error, heartbeat timeout between a server and a datastore, a zoneset being deactivated, a port failure, a link down, a host adaptor down, a virtual circuit down, a SAN port down, a Fibre Channel link down, and/or a virtual interface down.

In a further aspect of the invention, a cloud computing system having system domains including a storage domain, a network domain, a compute domain, and a virtual layer, the system comprising: a processor, and a memory containing stored instructions to enable the processor to: receive a first alert in a first domain of the system domains and a second alert in a second domain of the system domains, the first and second alerts caused by an event, determine a topology of the system including physical and logical connections for components in the storage, network, compute domains, and the virtual layer, perform connectivity matching to identify connections between a port in the first domain and a port in the second domain, and perform identify matching, using unique identifiers for domain components, to determine that a first component in the first domain associated with the first alert is the same component as a second component associated with the second alert in the second domain for cross domain event correlation.

BRIEF DESCRIPTION OF THE DRAWINGS

The foregoing features of this invention, as well as the invention itself, may be more fully understood from the following description of the drawings in which:

FIG. 6 is a tabular representation of alerts caused by a single failure in a pre-architected and pre-qualified cloud computing system;

DETAILED DESCRIPTION

Figure 1:
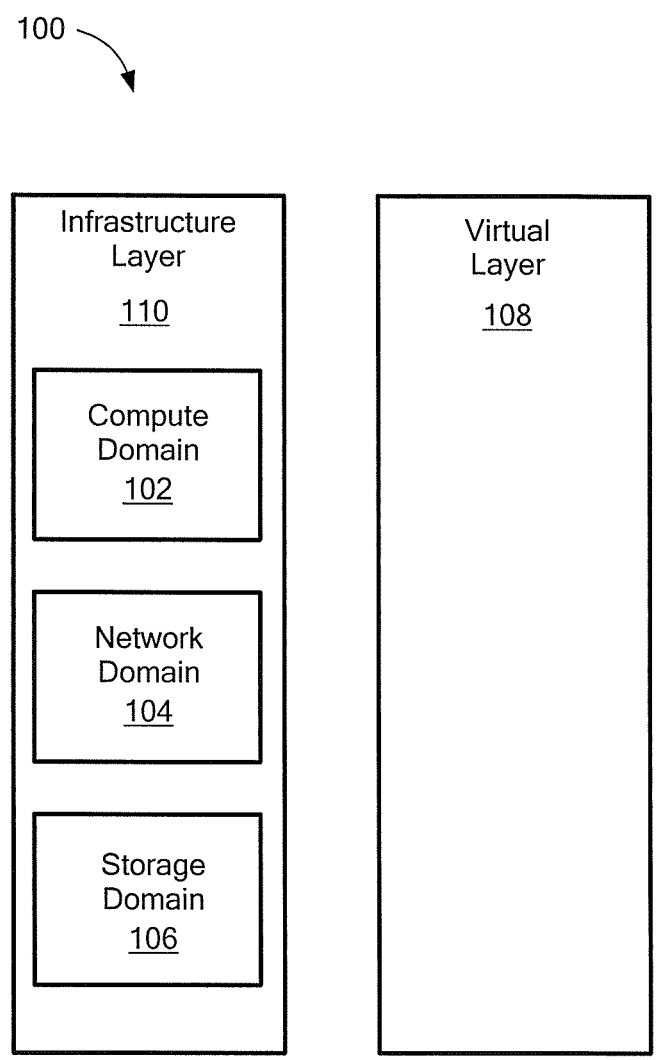
FIG. 1 is a high level schematic representation of a cloud computing system having cross domain event correlation in accordance with exemplary embodiments of the invention.

FIG. 1 shows an exemplary cloud computing environment 100 having cross domain event correlation in accordance with exemplary embodiments of the invention. The environment includes an infrastructure layer 110 and a virtual layer 108. The infrastructure layer 110 is further divided into compute domain 102, a network domain 104, and a storage domain 106. The environment may be referred to as a platform. It is understood that any practical number of platforms can be combined into a cloud computing environment.

The compute domain 102 comprises components, such as blade servers, chassis and fabric interconnects that provide the computing power for the platform. The storage domain 106 comprises the storage components for the platform. The network domain 104 comprises the components that provide switching and routing between the compute and storage domains 102, 106 within and between platforms, and to the client or customer network.

Figure 2:
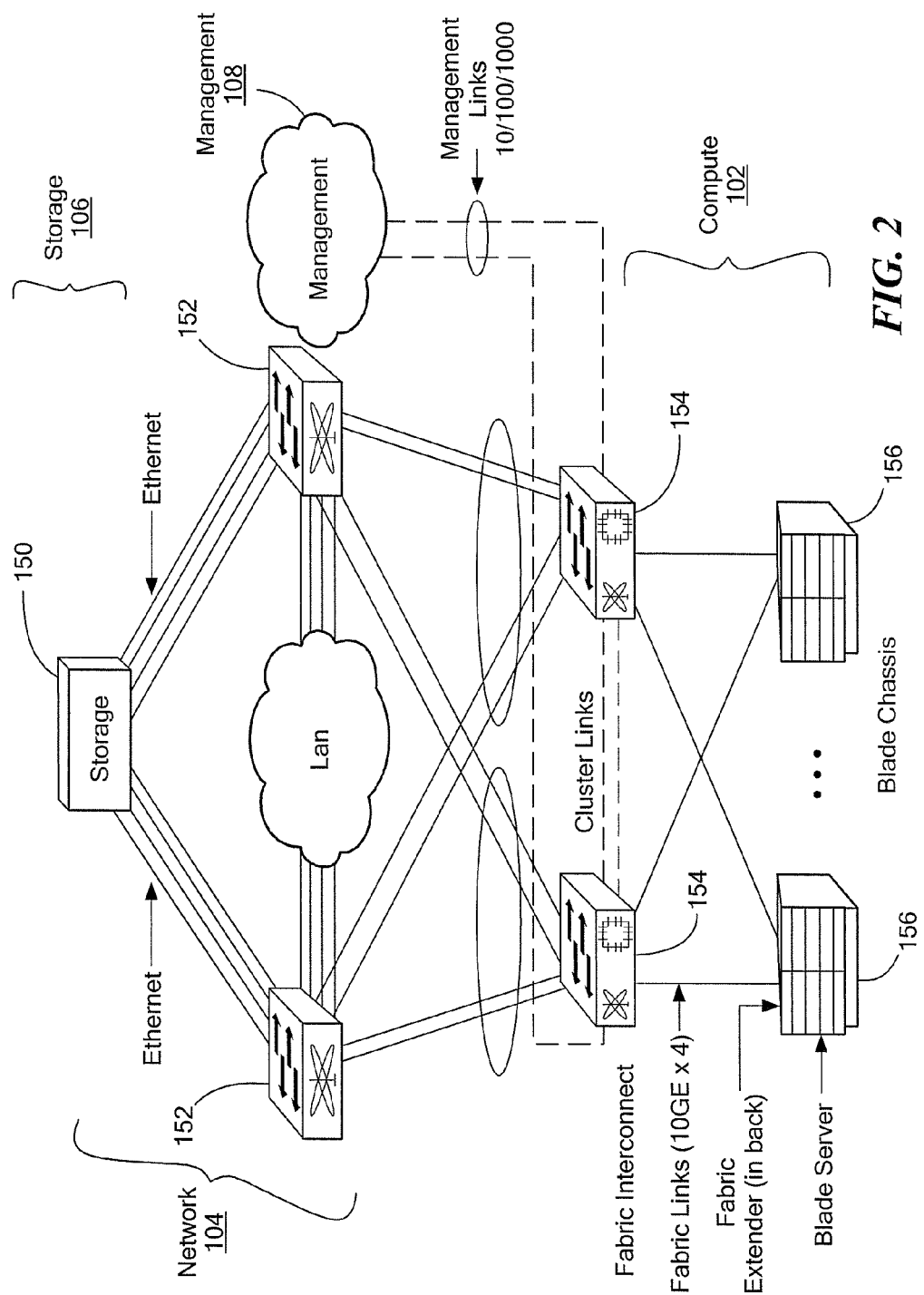
FIG. 2 is a schematic representation showing further detail of a pre-architected and pre-qualified cloud computing system of FIG. 1 including interconnections.

FIG. 2 shows further detail for the environment 100 of FIG. 1. The storage domain 106 can include storage components 150, such as CLARIION storage components from EMC Corporation of Hopkinton Mass. The network domain 104 can include a pair of switches 152, such as MDS 9000 Series Multilayer SAN Switches from Cisco of San Jose, Calif., coupled to the storage components and to a LAN. The compute domain 102 can include a pair of fabric interconnects 154, such as CISCO 6100 series devices. The compute domain can further include a number of blade servers 156, such as CISCO 5100 blade chassis.

Figure 3:
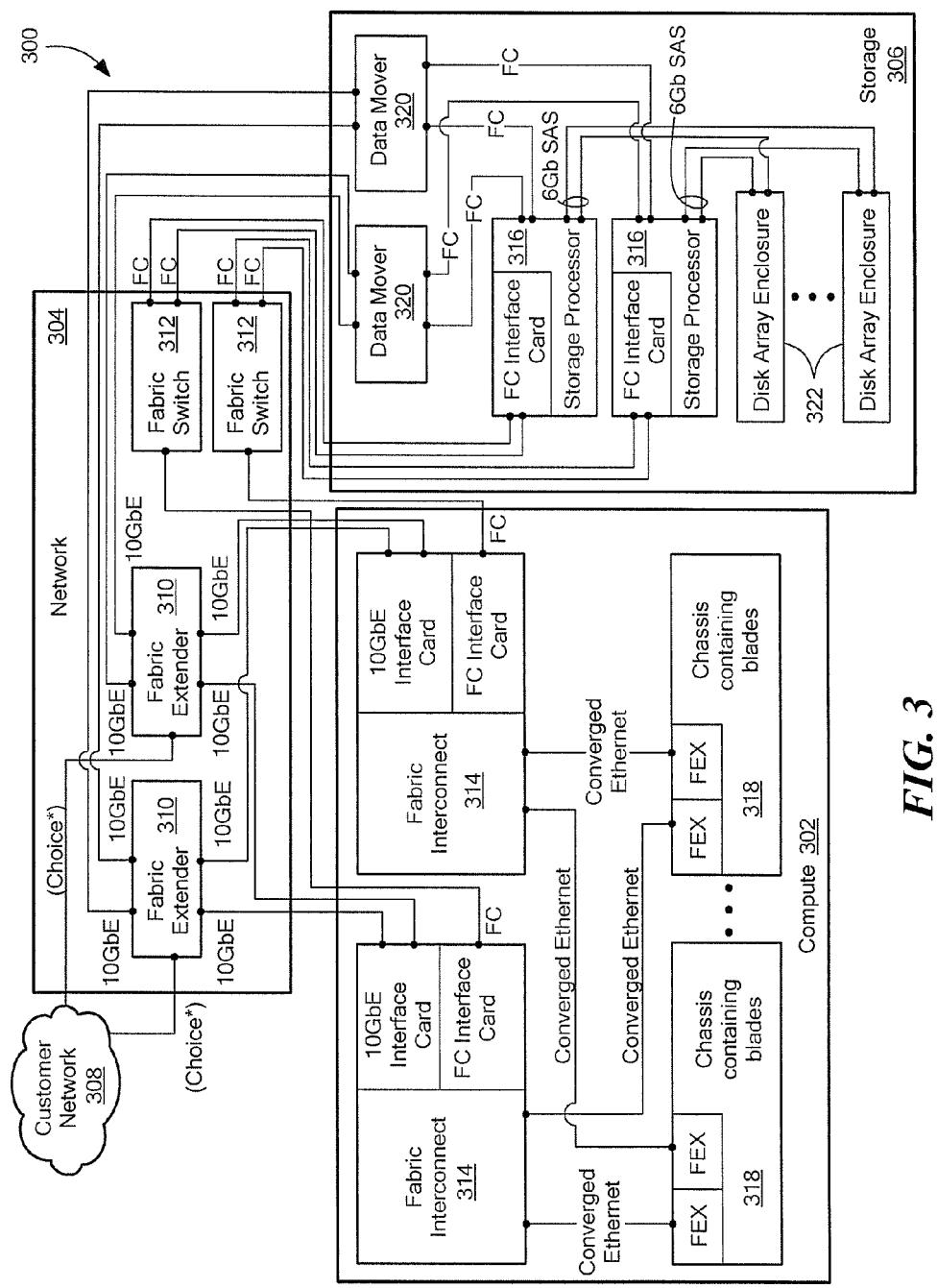
FIG. 3 is a schematic representation showing further detail of a pre-architected and pre-qualified cloud computing system of FIG. 2 including system components.
Figure 4:
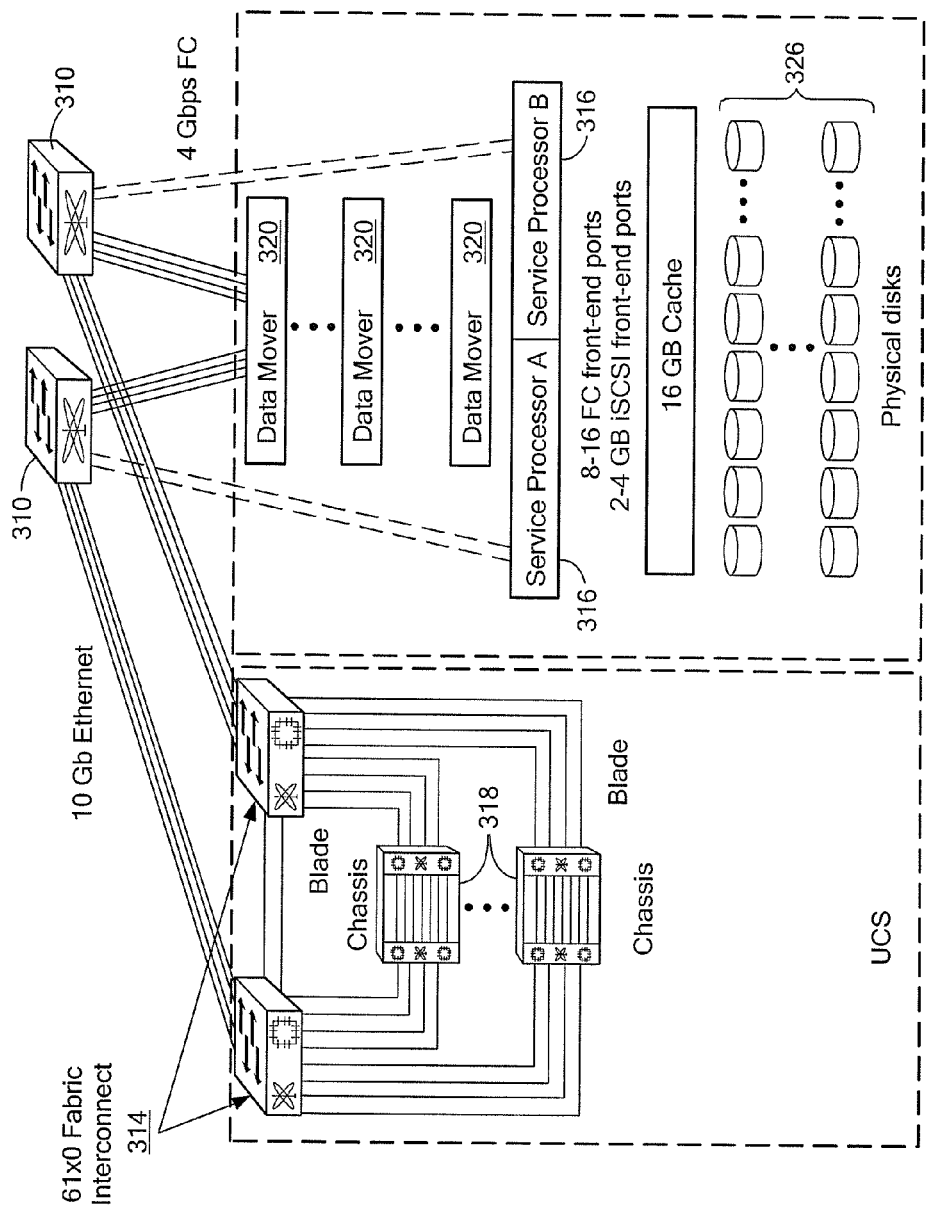
FIG. 4 is a schematic representation showing further detail of a storage domain of the cloud computing system of FIG. 3 using NAS for the storage domain.

FIG. 3 shows further detail of an exemplary cloud environment having a compute domain 302, a network domain 304 and a storage domain 306. The network domain 302 is coupled to a customer network 308 in a manner known in the art. The network domain 302 includes switches 310 coupled to the customer network 308. The network domain 302 also includes multilayer fabric switches 312 coupled to fabric interconnects 314 in the compute domain 302 and to storage processors 316 in the storage domain 306. The fabric interconnects 314 are coupled to blade server chassis 318 containing blades. Data movers 320 in the storage domain 306 are coupled between the storage processors 316 and the switches 310 in the network domain. Disk array enclosures 322 are coupled to the storage processors 316. FIG. 4 shows interconnections for a system similar to that shown in FIG. 3 with physical disks 326. In the illustrated embodiment, the storage domain includes 8 to 16 front end fibre channel ports and 2-4 GB iSCSI front end ports. It is understood that a variety of other configurations having different interconnections and storage configuration can be provided to meet the needs of a particular application. The virtual layer can include a number of applications to perform various functions for overall control, configuration, etc of the various platform components. For example, virtual layer applications can include a virtualization function, such as VSPHERE/VCENTER, by VMware of Palto Alto, Calif.

Each of the infrastructure domains and the virtual layer is managed by a separate element management system. One of such element management systems is the Unified Computing System (UCS) Manager by Cisco. It is understood that the blade chassis and fabric interconnection can be considered part of the UCS. Another management application can include a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
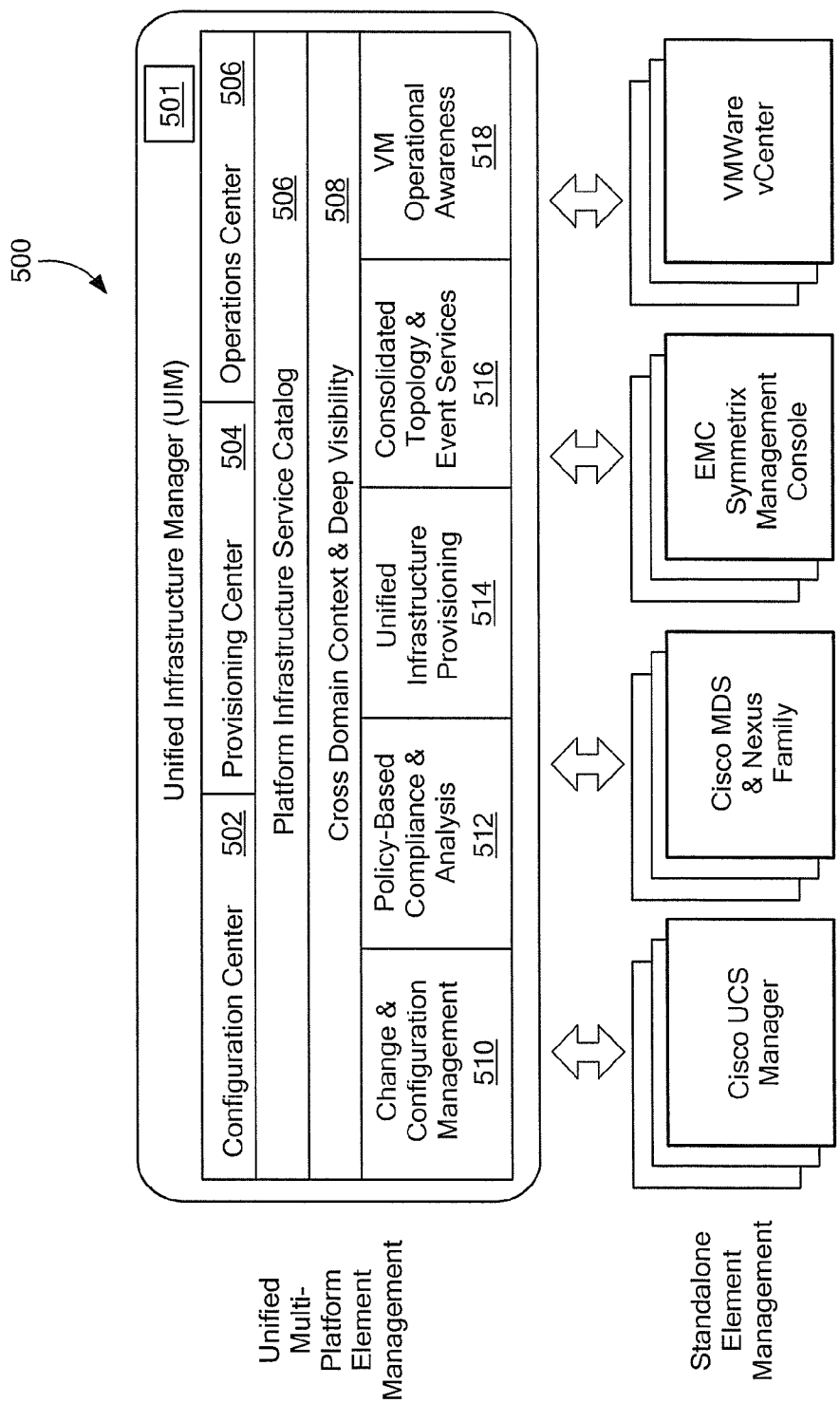
FIG. 5 is a schematic representation of a unified infrastructure manager (UIM) module showing component layering.

FIG. 5 shows an exemplary unified infrastructure manager 500. In one embodiment, the unified infrastructure manager 500 includes a configuration center module 502, a provisioning center module 504, and an operations center module 506 having cross domain event correlation in accordance with exemplary embodiments of the invention. Below these modules are a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage domains, and other management applications.

The unified infrastructure manager 500 performs platform deployment by abstracting the overall provisioning aspect of the platform(s) and offering granular access to platform components for trouble shooting and fault management.

In one aspect of the invention, a uniform infrastructure management module includes a cross domain event correlation module to process alerts from physical infrastructure, logical services, virtual applications, and tenant/organizations. It is understood that cloud environments can provide storage for multiple tenants/organizations.

For example, a Vblock leverages VMware, Cisco, and EMC packages with integrated computing, network, storage, and management capabilities. Each of the domains has its own management system. When a component, for example, fails, multiple domain management systems may report an alert indication representing the same failure. For example, when a UCS port fails, a fault is triggered in the UCS. At the same time, vCenter also reports an alarm on the corresponding VMNIC. These two events indicate the same failure. To correlate duplicate events across different domains, the affected objects are matched using unique identifiers. In one embodiment, the following is used to perform matching and event correlation: UCS/vHBA and vSphere/vmhba using WWPN; match UCS/FCPort and MDS/FCPort using WWPN; match UCS/Blade and vCenter/ESX using UUID; match Storage/Volume and vCenter/Datastore using UUID; and matching StoragePort and vCenter/ScsiTarget using WWPN.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

WWPN: World Wide Port Name

UUID: Universally Unique Identifier

HBA: Host Bus Adapter

NIC: Network Interface Card

FC: Fiber Channel

The cloud computing environment is broken up into layers: infrastructure (or physical) layer and the virtual layer. In exemplary embodiments, the infrastructure layer is divided into three domains (silos): compute, network, storage, because traditionally they are managed separately with respective element management systems.

FIG. 6 shows an exemplary representation 600 of a port failure in a SAN component listing the domain 602, raw alert 604, alert count 606, and correlation 608, which are described below in detail. In the SAN switch domain 610, there is a link down 612, which is the root cause 614 of the alert as shown in the correlation column. The alert count 616 is one.

The UCS domain 620 lists a series of raw alerts 622 generated by the SAN port failure in SAN switch domain. As can be seen, the UCS alerts 622 include a FC link down, a host HBA down, a virtual interface down, and a virtual circuit down for a count of 13 in the UCS domain. The vCenter domain 624 lists two raw alerts 626 with a total count of 23 alerts (10+13). A total of 37 alerts are generated in three domains due the root cause SAN port failure.

Figure 7:
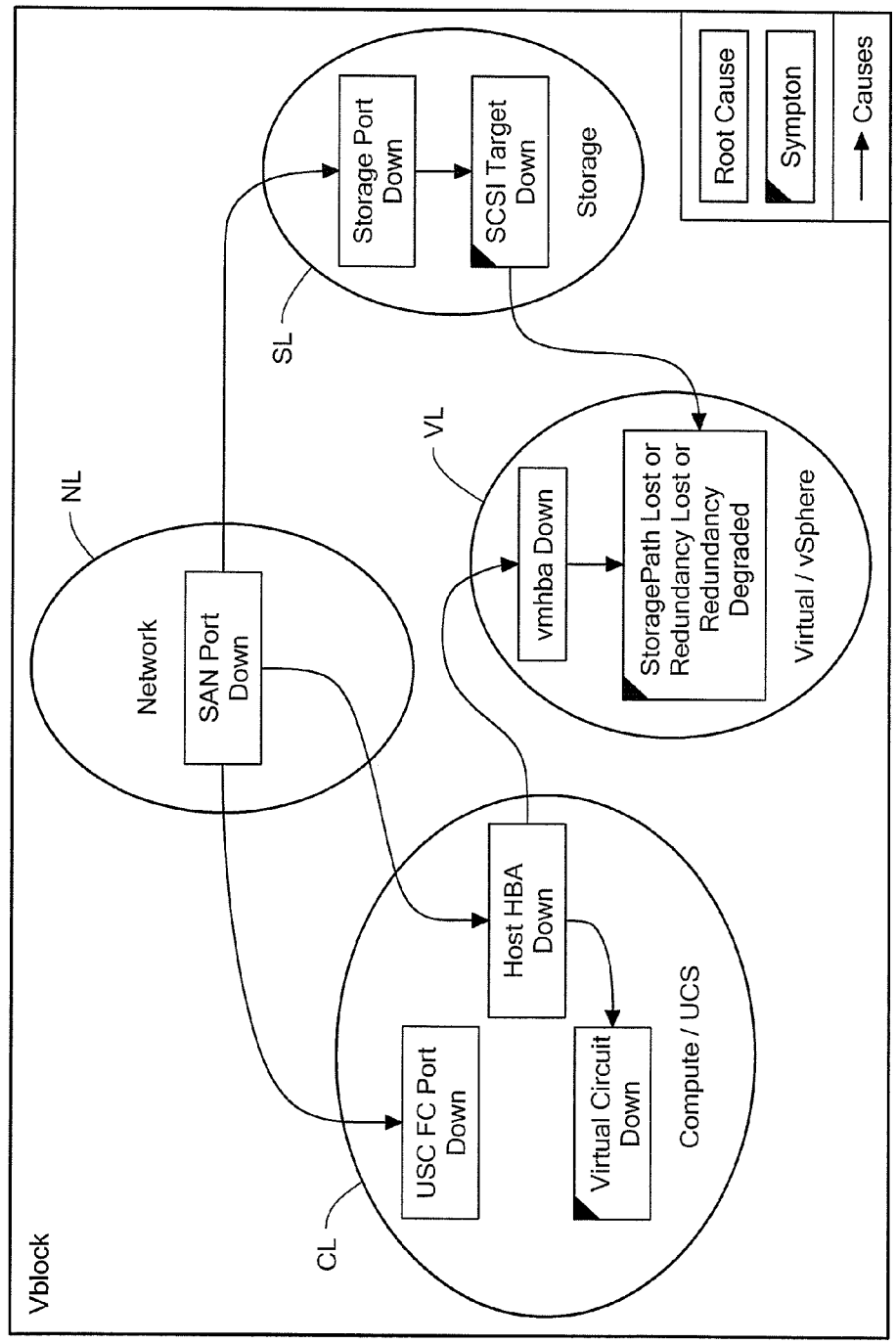
FIG. 7 is a schematic representation of cross-domain event correlation.

FIG. 7 shows an exemplary representation of cross domain event correlation for root cause events generated in a network domain NL, compute domain CL, storage domain SL, and virtual layer VL. The root causes have respective symptoms. For example, a host HBA down in the compute domain CL has as a symptom a virtual circuit down. While a domain management system may correlate events within that domain, cross-domain event correlation correlates events across the various domains, as described more fully below.

Figure 8:
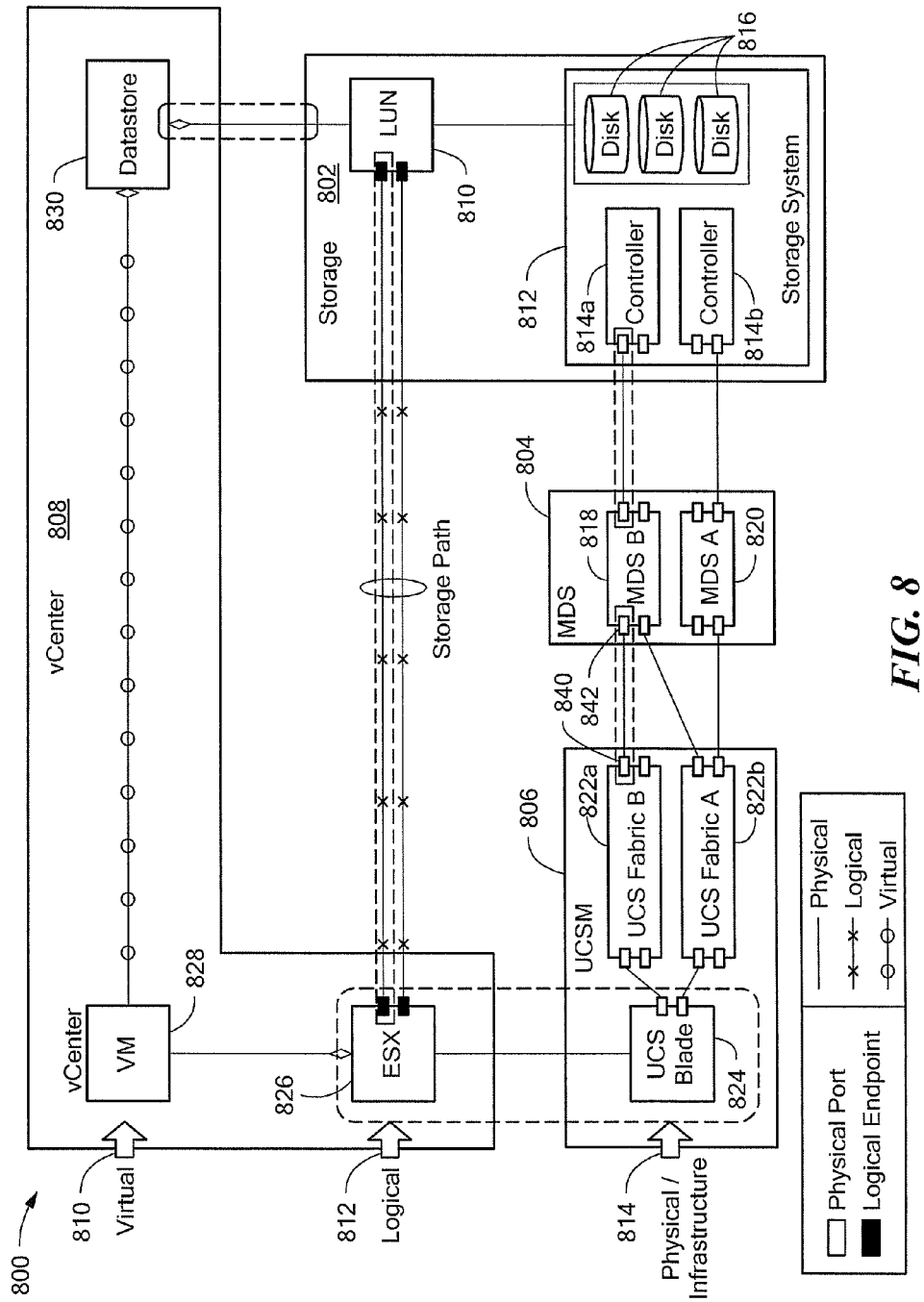
FIG. 8 is a schematic representation of an exemplary system having domains and layers.

FIG. 8 shows cross domain matching with connectivity and identity of components. The exemplary system 800 includes a storage domain 802, a network domain 804, a compute domain 806 and a virtual 808. The system is shown having a virtual layer 810, a logical layer 812, and a physical infrastructure layer 814.

Each of the storage 802, network 804, compute 806 domains and the virtual layer is managed by respective element management systems. In an exemplary embodiment, cross-domain correlation establishes relationships between objects in different domains or layers, as shown in the dash-lined boxes.

The storage domain 802 comprises a LUN 810 and a storage system 812 having first and second controllers 814a,b and disk arrays 816. The network domain 804 comprises first and second switches 818, 820 coupled between the storage domain 802 and the compute domain 806, which includes first and second fabric switches 822a,b and a UCS blade 824. The virtual layer 808 comprises an ESX server 826, a virtualization application 828, such as VM, and a datastore application 830. As can be seen, the components, domains and layers are connected by physical, logical and transaction connections. For example, physical connections between ports are shown between the first UCS fabric switch B 822a and the first network switch 818. A cross-domain logical connection is shown between the ESX server 826 and the storage LUN 810. A virtual connection is shown between VM 828 and the datastore 830.

In one particular embodiment, first and second categories of alert matching include connectivity matching and identity matching. For connectivity matching, a port 840 in the UCS fabric 822a is connected to a port 842 in the MDS switch via a cable. If the MDS reports that port 842 is down, then it is very likely the UCSM 806 will also report the connected UCS port 840 down. The system stores port-to-port connectivity for the components in the domains.

For identity matching, the same storage volume is represented in both the storage system and the vCenter/vSphere environment, for example. If there is a failure on the storage volume 810, the management systems for the storage domain 802 and the virtual layer 808 will report an alert. The two alerts in the different domains are reconciled to determine the root cause, as described more fully below.

Figure 9:
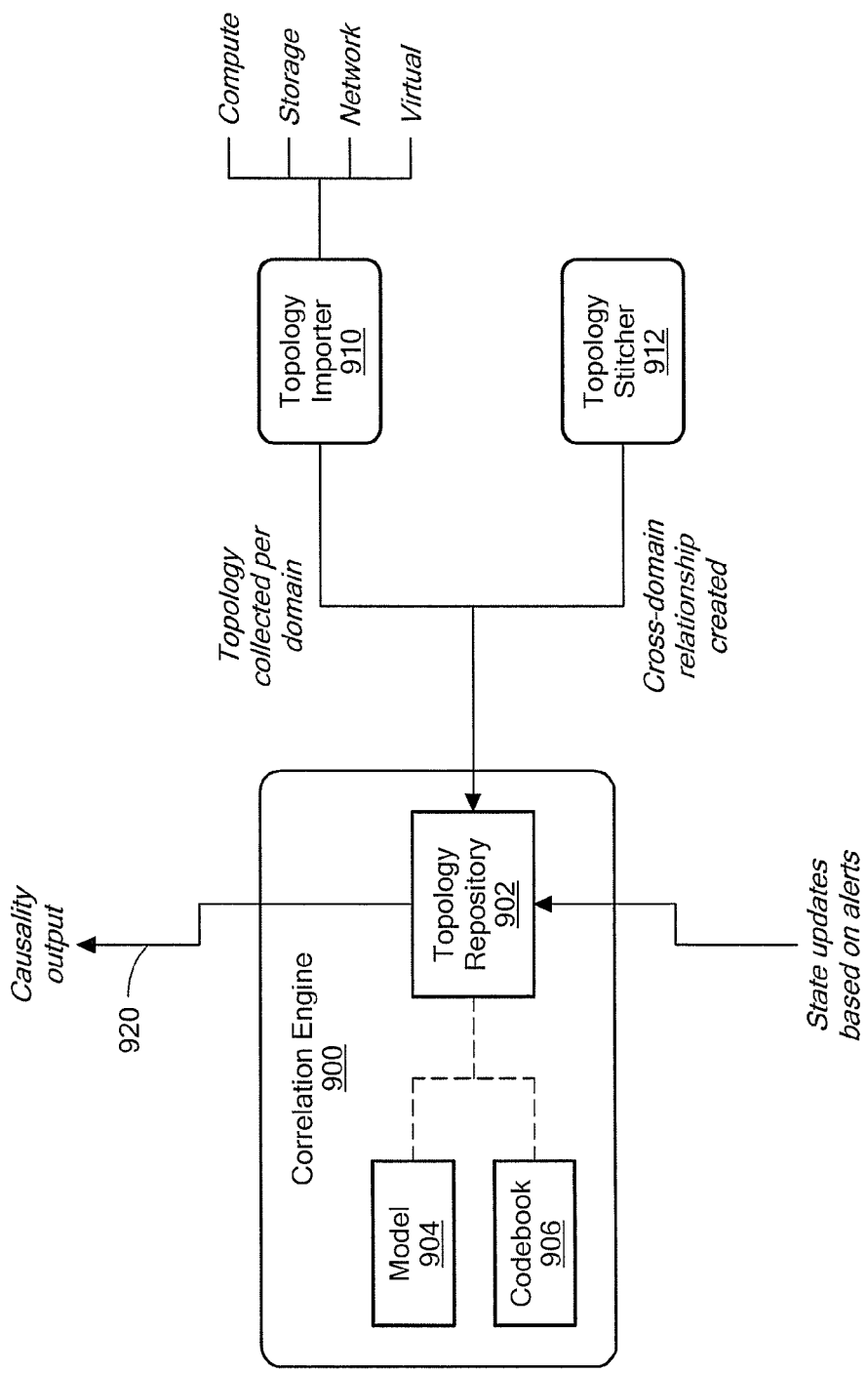
FIG. 9 is a schematic representation of components in the event correlation engine in the UIM/Operations product.

FIG. 9 shows an exemplary implementation of the cross-domain event correlation in accordance with exemplary embodiments of the invention. An event correlation engine/module 900 includes a topology repository module 902 to store the infrastructural topology objects of all domains and their connections, the virtual layer objects, and their relationships with the infrastructural objects. The schema of the topology objects are driven by a predefined model 904. A codebook module 906 takes the repository data (topology, relationship, status) as the input and calculates the causality relationships between the events or alerts.

A topology importer module 910 obtains topology information for the system, such as the UCS, storage, network domains and the virtual layer, for transmission to the topology repository module 902. The topology importer creates and maintains topology objects and intra-domain relationships by periodically querying data sources and instantiating objects. A topology stitcher module 912 creates cross-domain relationships, as described more fully below. In general, the topology stitcher 912 builds relationships among cross-domain objects, which enables the correlation engine 900 to correlate alerts from different domains.

State updates are performed based upon the received alerts by mapping an alert to a state of a topology object. A so-called "event" is triggered by a certain condition of the state, and the correlation engine 900 determines the relationships among the events based on the model 904 and the topology relationships instantiated by the topology importer 910 and stitcher 912.

The causality output 920 from the topology repository 902 enables the system to fetch events, and then for each event, to query the related events. For example, if event A causes event B, then B will be returned in the list of getExplainedBy(A).

Figure 10:
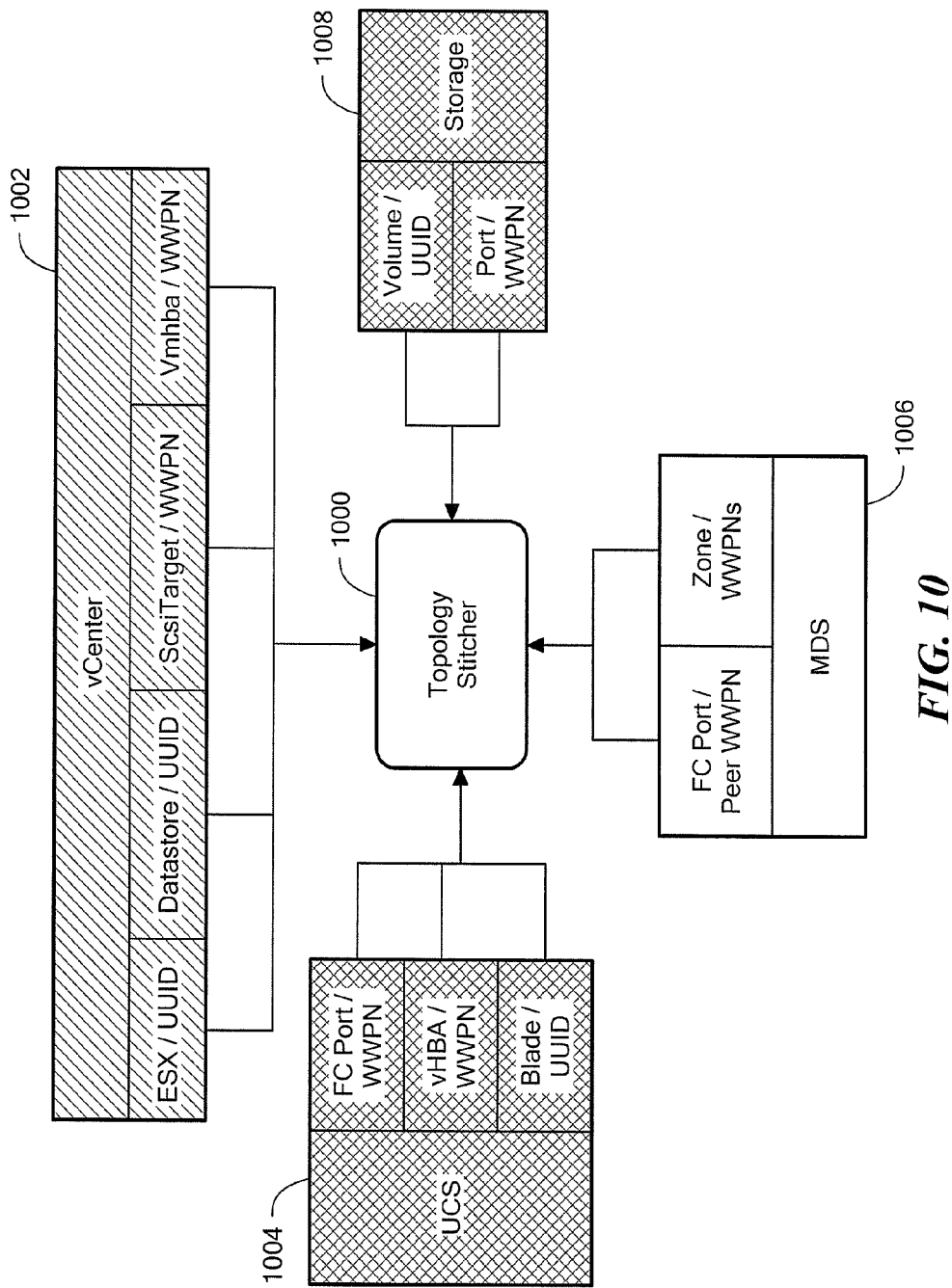
FIG. 10 is a schematic representation of a topology stitcher receiving information from components in the system.

FIG. 10 shows further detail for an exemplary topology stitcher 1000. The topology stitcher 1000 examines objects and their unique identifications from different domains. The input from vCenter 1002 to the topology stitcher, for example, is the UUID (Universally Unique IDentifier) of ESX and Datastore, as well as the WWPN (World Wide Port Name) of ScsiTarget and vmhba. The UUID and the WWPN are used as unique identifiers for the topology stitcher to match related objects from other domains.

Similarly, input from the UCS 1004 includes the WWPN for the FC ports, the WWPN for the vHBAs, and UUID for the blade. Input from the UCS 1006 includes the peer WWPN for FC ports and the WWPN for the zones. Input from the storage domain 1008 includes the UUID for the storage volumes and the WWPN for the storage ports.

In one embodiment, the input and the matching criteria are defined in an XML file, so that newly identified matching criteria can be easily added without code changes for the topology stitcher to perform its function. Below is an example:

<ScsiTarget>
...
<matching targetClass="StoragePort" relationship="LayeredOver"
isRelationshipset="true">
<property selfProperty="WWPN" propertyInTarget="WWPN"/>
</matching>
</ScsiTarget>

Figure 11:
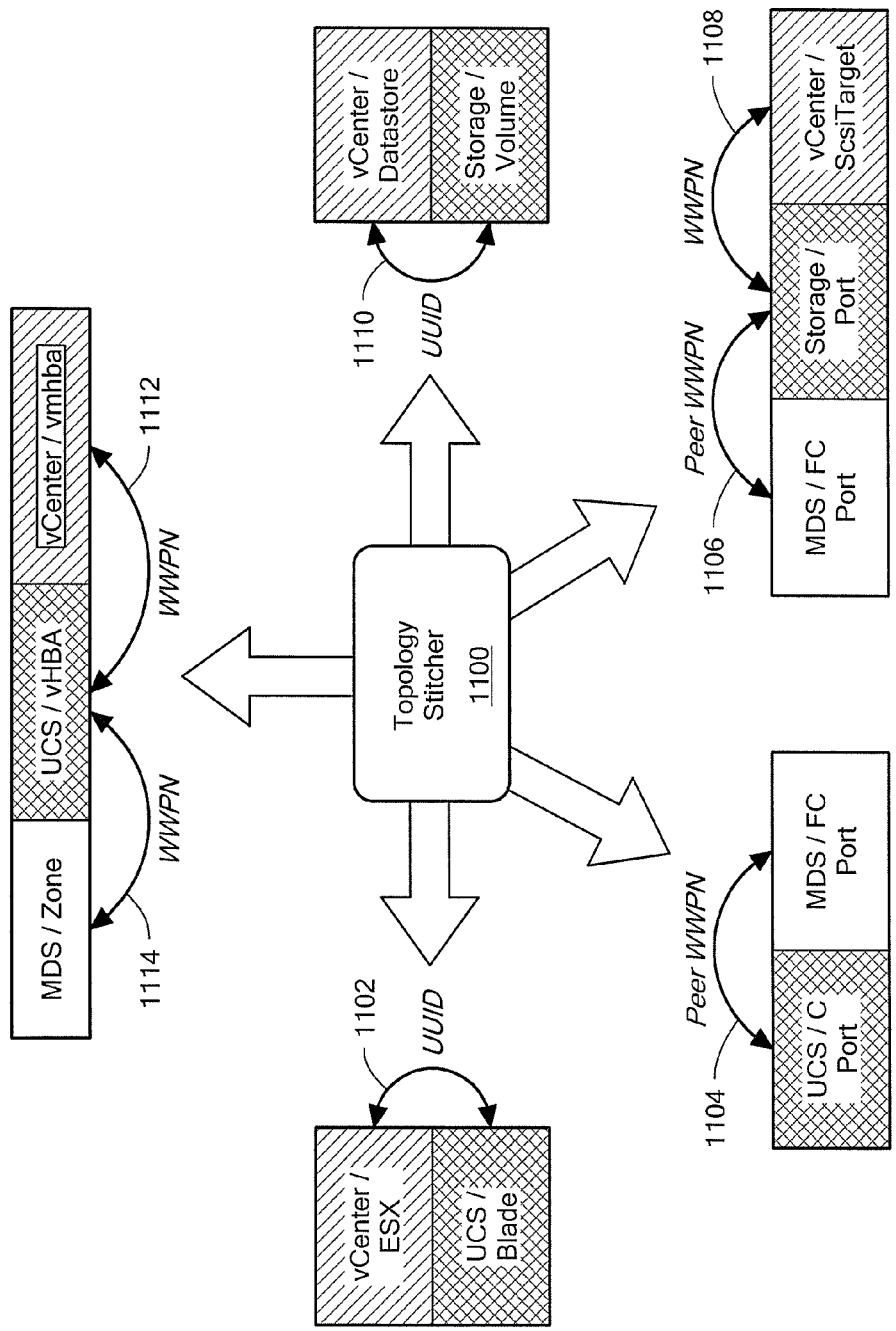
FIG. 11 is a schematic representation of output information from the topology stitcher.

This section of data instructs the topology stitcher to do the following: For objects in class ScsiTarget, find objects in StoragePort that have the same WWPN, and create a relationship called "LayeredOver" between them. In other words, a matching criteria is characterized by the following elements:
classA
classB
A list of matching property pairs {propertyA1, propertyB1; propertyA2, propertyB2; ...}
relationshipName
isRelationshipSet—indicates whether the relationship is a one-to-one or one-to-many relationship FIG. 11 shows exemplary topology stitcher outputs. In one embodiment, the topology stitcher 1100 performs 7 matches, resulting in 5 identity groups of classes shown in the diagram. The 7 pairs of matches, counter-clockwise starting from the left, are as follows:
Matching UCS/Blade and vCenter/ESX using UUID 1102
Matching UCS/FCPort and MDS/FCPort using Peer WWPN 1104
Matching MDS/FCPort and Storage/Port using Peer WWPN 1106
Matching Storage/Port and vCenter/ScsiTarget using WWPN 1108
Matching Storage/Volume and vCenter/Datastore using UUID 1110
Matching UCS/vHBA and vCenter/vmhba using WWPN 1112
Matching MDS/Zone and UCS/vHBA using WWPN 1114

Exemplary pseudo code for generating matches is set forth below:

```
for each matching criteria {
  for each object objB in classB {
    generate a string key that concatenate the values of all
      matching properties: key=objB.propertyB1.value+
      delim+objB.propertyB2.value+ ... ;
    save the object in a hash map, using the generated key:
      bMap.put(key, objB);
  }
  for each object objA in classA {
    generate a string key that concatenate the values of all
      matching properties: key=objA.propertyA1.value+
      delim+objA.propertyA2.value+ ... ;
    lookup bMap using the key to see if matches are found:
      matchedObjBSet=bMap.get(key);
    for each objB in matchedObjBSet
    {
      if (isRelationshipSet) {objA.relationshipName.insert
        (objB);}
      else {objA.relationshipName=objB;}
    }
  }
}
```

Figure 11A:
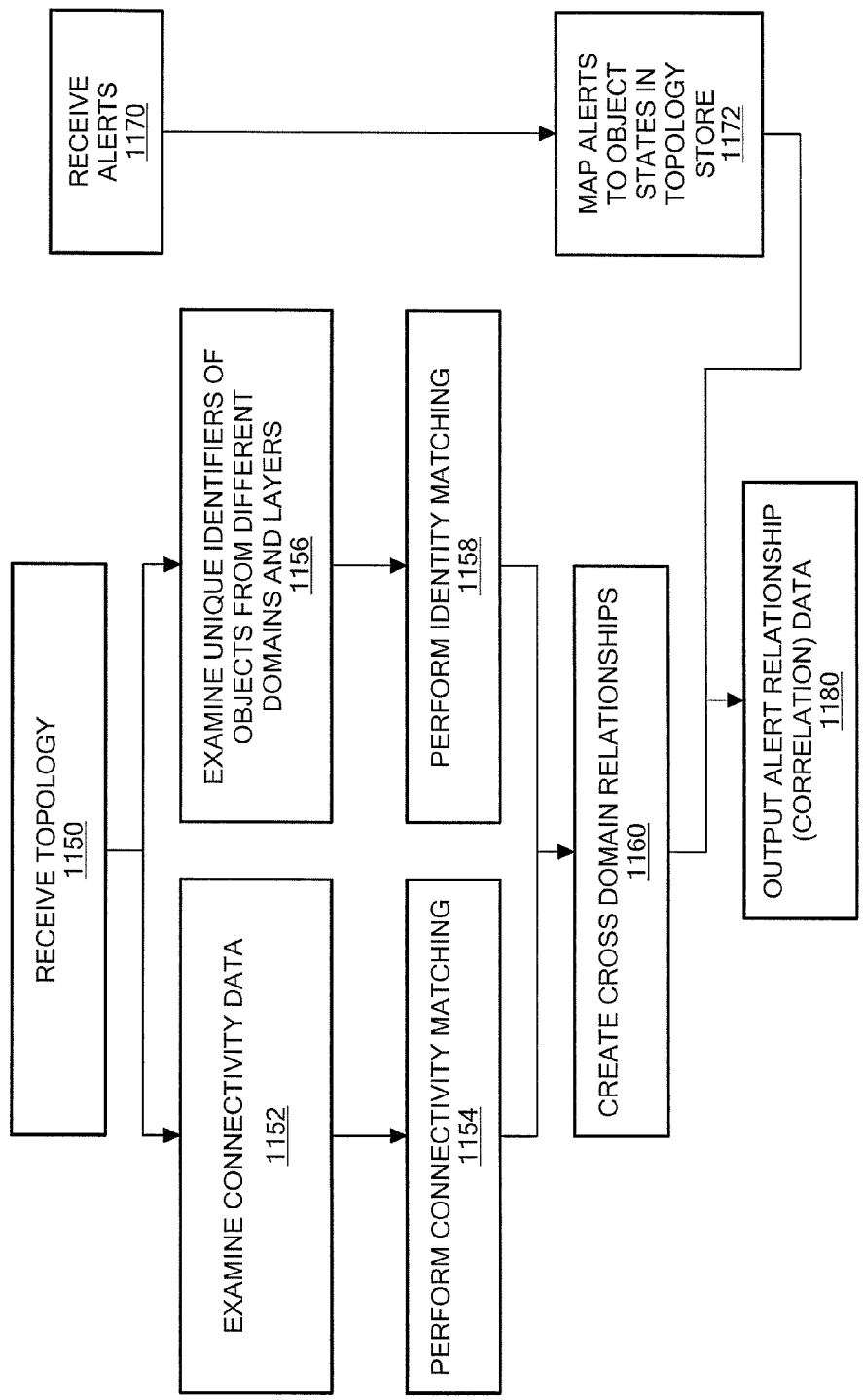
FIG. 11A is a schematic representation of the flow of event correlation processing implemented in the UIM/Operations product.

FIG. 11A shows an exemplary sequence of steps for providing cross-domain event correlation. In step 1150, topology data is retrieved from various infrastructure domains and the virtual layer. In step 1152, connectivity data is examined. For example, the port-to-port connectivity for the various components in various domains is examined. In step 1154, connectivity matching of corresponding components from various domains is performed.

In parallel, in step 1156, the objects are examined, regardless of whether there is alert, along with the unique identifiers from the domains. In step 1158, identity matching is performed based on the unique identifiers. In 1160, corresponding relationships are created based on the matches for cross-domain event correlation, as shown in FIG. 11.

In step 1170, an event in the system, such as a link failure, generates alerts in multiple domains that are received by the management domain. In step 1172, the alerts are mapped to object states in the topology store. In step 1180, relationships of alerts are made consumable by users.

Figure 12:
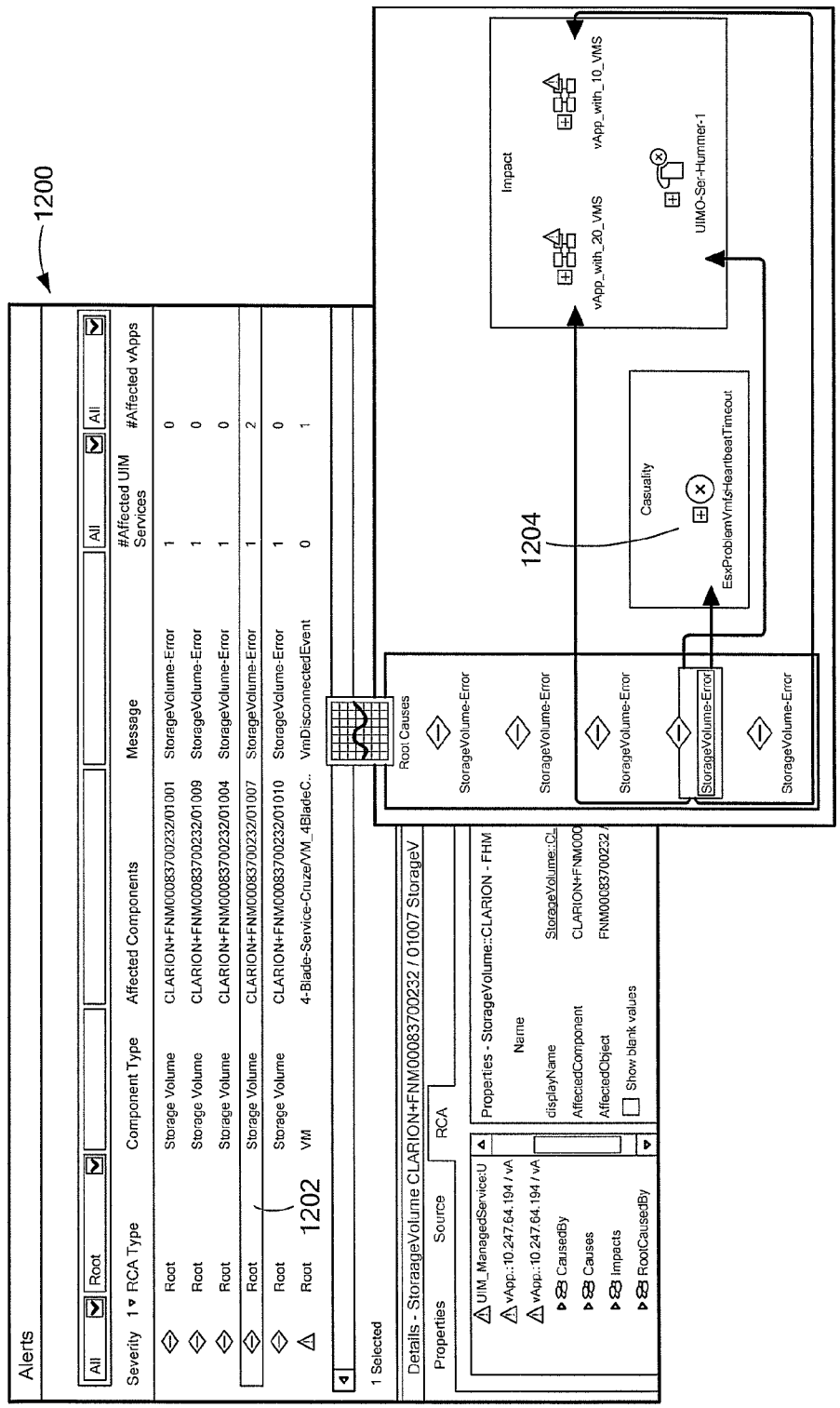
FIG. 12 is an exemplary display of cross-domain alert information.

FIG. 12 shows an exemplary screen display 1200 of an event correlation result between a StorageVolume alert 1202 and a Datastore alert: 1204. The Storage Volume alert 1202, called StorageVolume-Error, indicates the Storage Volume operational state is Error. The Datastore alert 1204, called EsxProblemVmfsHeartbeatTimeout, indicates the datastore is no longer reachable by the ESX. It is understood that the storage volume alert 1202 corresponds to the root cause of the alert.

Figure 13:
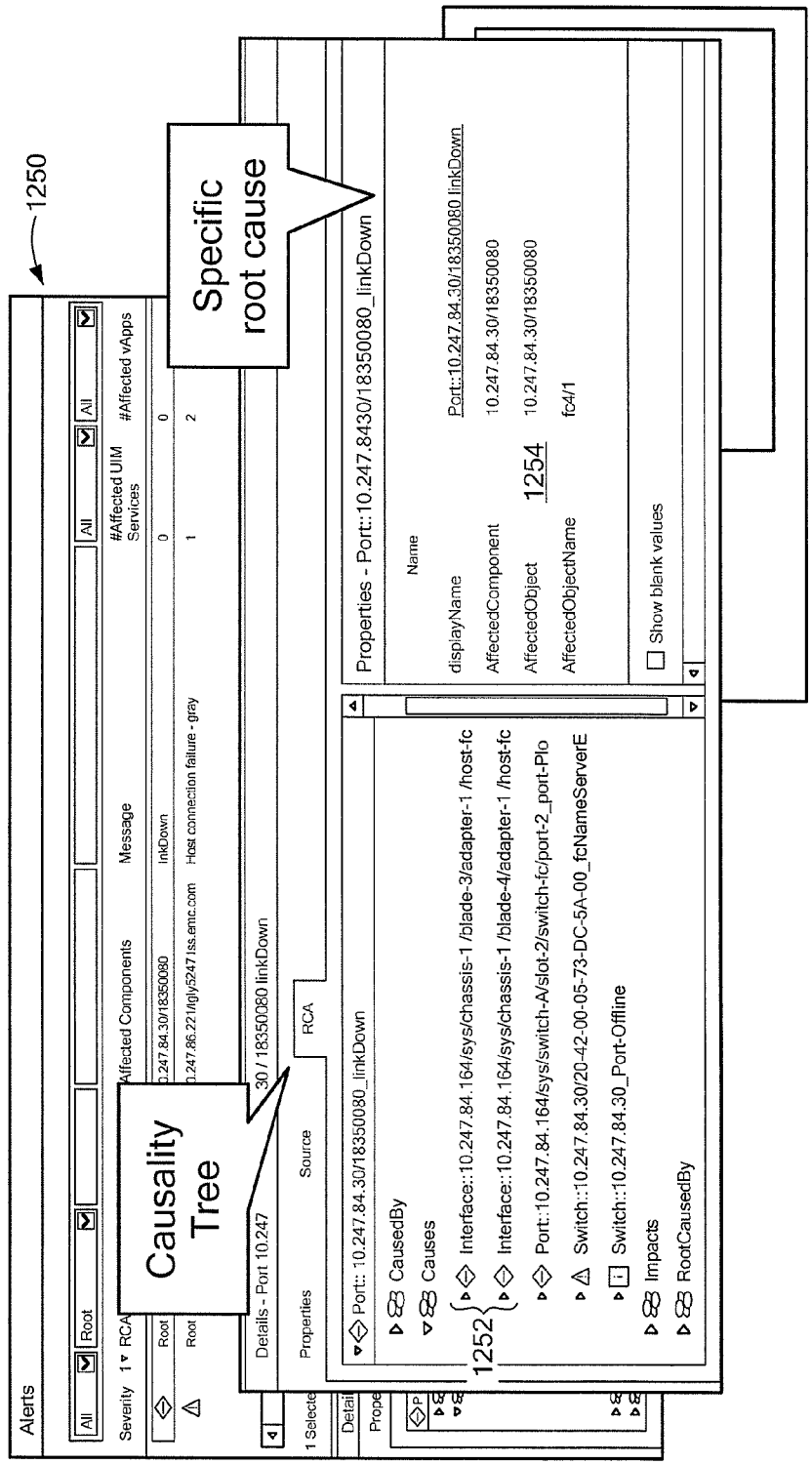
FIG. 13 is an exemplary display of alert causality and root cause.

FIG. 13 shows an exemplary screen display 1250 of a further event correlation result including the first level of the causality tree under the link down alert of an MDS/FCPort. This event correlates the following alerts:
The link down alert 1252 of two UCS/vHBA interfaces since they share the same zone with the MDS/FCPort, shown by the first two lines under the Causes node;
The link down alert 1254 of the matched UCS/FCPort, shown by the third line under the Causes node.
The following table illustrates the cross domain identity matching between the storage volume or LUN on storage arrays and the datastore in VMware vSphere

| Domain | Storage | vSphere |
|---|---|---|
| Resource type | Storage Volume [LUN] | Datestore |
| Identifiers | UUID | UUID |
| Examples | 60:06:01:60:3B:40:2D:00:42:2E:06:59:4F:62:E1:11 | naa.600601603b402d00422e06594f62e111 |

Figure 14:
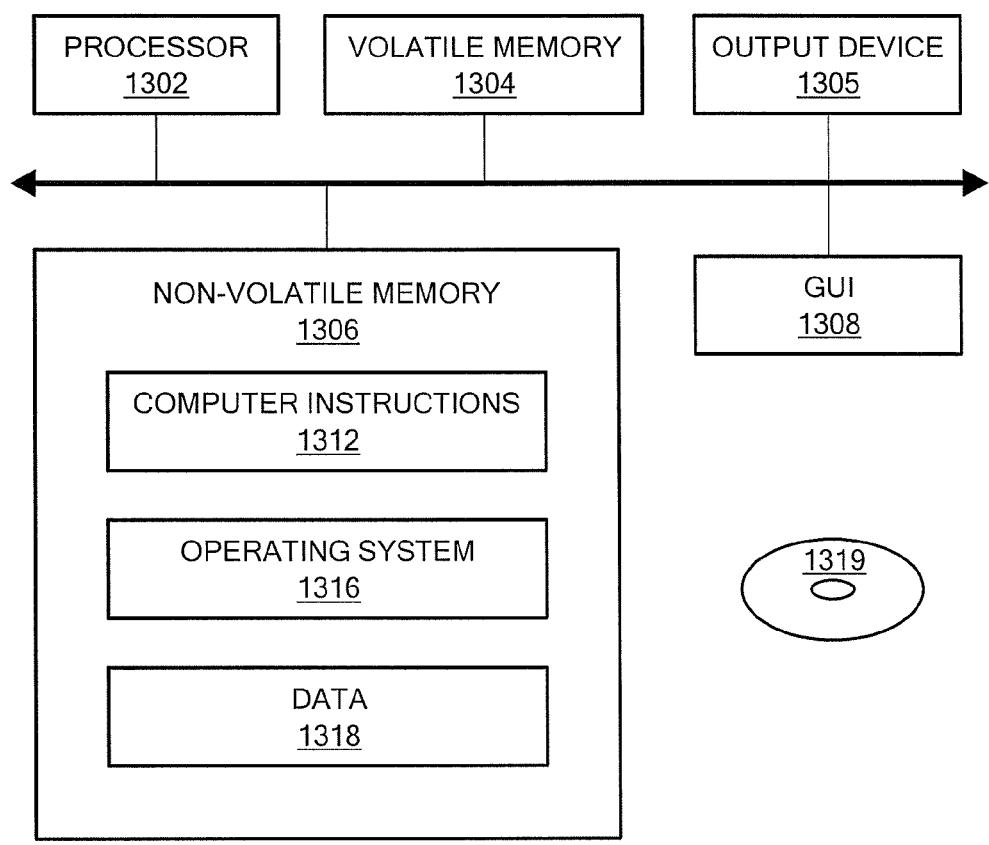
FIG. 14 is a schematic representation of an exemplary computer that can perform at least some of the processing described herein.

FIG. 14 shows an exemplary computer that can perform at least a part of the processing described herein. A computer 10 includes a processor 1302, a volatile memory 1304, an output device 1305, a non-volatile memory 1306 (e.g., hard disk), and a graphical user interface (GUI) 1308 (e.g., a mouse, a keyboard, a display, for example). The non-volatile memory 1306 stores computer instructions 1312, an operating system 1316 and data 1318, for example. In one example, the computer instructions 1312 are executed by the processor 1302 out of volatile memory 1304 to perform all or part of the processing described above. An article 1319 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
 in a cloud computing system having system domains including a storage domain, a network domain, a compute domain, and a virtual layer, which comprises a virtualization server, a virtualization application, and a data store application;
 receiving a first alert in a first domain of the system domains and a second alert in a second domain of the system domains, the first and second alerts caused by a first event in the first domain and receiving a third alert in the virtual layer;
 determining a topology of the system including physical and logical connections for components in the storage, network, compute domains, and the virtual layer, wherein the topology comprises topology objects;
 performing, using a computer processor, connectivity matching to identify connections between ports in the first domain and ports in the second domain for port-to-port connectivity between components in the first and second domains;
 performing identity matching, using unique identifiers for domain components that are hardware components, to determine that a first component in the first domain associated with the first alert is the same component as a second component associated with the second alert in the second domain for cross domain event correlation;
 maintaining intra-domain relationships by periodically querying the components in the system domains;
 receiving alerts for a second event that is caused by and related to the first event;
 performing state updates by mapping the first and second alerts to respective states of ones of the topology objects, wherein the first and second events correspond to respective states of the ones of the topology objects; and
 querying at least one of the first and second events to determine that the second event is explained by the first event.

2. The method according to claim 1, wherein the first component comprises a storage volume in the storage domain.

3. The method according to claim 1, wherein the first component comprises a port in the network domain for a switch component.

4. The method according to claim 1, wherein the first component comprises a cable connected to a fabric in the compute domain.

5. The method according to claim 1, wherein the first component comprises a server in the virtual layer.

6. The method according to claim 1, further including querying the first alert.

7. The method according to claim 1, wherein the unique identifiers include a WWPN and/or a UUID.

8. The method according to claim 1, wherein the first alert includes one of a server down or connection lost, a storage volume error, heartbeat timeout between a server and a datastore, a zoneset being deactivated, a port failure, a link down, a host adaptor down, a virtual circuit down, a SAN port down, a Fibre Channel link down, and/or a virtual interface down.

9. An article, comprising:
 a non-transitory computer readable medium containing stored instructions that enable a machine to perform, in a cloud computing system having system domains including a storage domain, a network domain, a compute domain, and a virtual layer, which comprises a virtualization server, a virtualization application, and a data store application;

receiving a first alert in a first domain of the system domains and a second alert in a second domain of the system domains, the first and second alerts caused by a first event;

determining a topology of the system including physical and logical connections for components in the storage, network, compute domains, and the virtual layer, wherein the topology comprises topology objects;

performing, using a computer processor, connectivity matching to identify connections between a port in the first domain and a port in the second domain;

performing identify matching, using unique identifiers for domain components that are hardware components, to determine that a first component in the first domain associated with the first alert is the same component as a second component associated with the second alert in the second domain for cross domain event correlation;

maintaining intra-domain relationships by periodically querying the components in the system domains;

receiving alerts for a second event that is caused by and related to the first event; performing state updates by mapping the first and second alerts to respective states of ones of the topology objects, wherein the first and second events correspond to respective states of the ones of the topology objects; and querying at least one of the first and second events to determine that the second event is explained by the first event.

10. The article according to claim 9, wherein the first component comprises a storage volume in the storage domain.

11. The article according to claim 9, wherein the first component comprises a port in the network domain for a switch component.

12. The article according to claim 9, wherein the first component comprises a cable connected to a fabric in the compute domain.

13. The article according to claim 9, wherein the first component comprises a server in the virtual layer.

14. The article according to claim 9, further including querying the first alert.

15. The article according to claim 9, wherein the unique identifiers include a WWPN and/or a UUID.

16. The article according to claim 9, wherein the first alert includes one of a server down or connection lost, a storage volume error, heartbeat timeout between a server and a datastore, a zoneset being deactivated, a port failure, a link down, a host adaptor down, a virtual circuit down, a SAN port down, a Fibre Channel link down, and/or a virtual interface down.

17. A cloud computing system having system domains including a storage domain, a network domain, a compute domain, and a virtual layer, which comprises a virtualization server, a virtualization application, and a data store application, the system comprising:

a processor; and a memory containing stored instructions to enable the processor to:

receive a first alert in a first domain of the system domains and a second alert in a second domain of the system domains, the first and second alerts caused by a first event;

determine a topology of the system including physical and logical connections for components in the storage, network, compute domains, and the virtual layer, wherein the topology comprises topology objects;

perform connectivity matching to identify connections between a port in the first domain and a port in the second domain;

perform identify matching, using unique identifiers for domain components that are hardware components, to determine that a first component in the first domain associated with the first alert is the same component as a second component associated with the second alert in the second domain for cross domain event correlation;

maintaining intra-domain relationships by periodically querying the components in the system domains;

receiving alerts for a second event that is caused by and related to the first event; performing state updates by mapping the first and second alerts to respective states of ones of the topology objects, wherein the first and second events correspond to respective states of the ones of the topology objects; and querying at least one of the first and second events to determine that the second event is explained by the first event.

* * * * *